(12) United States Patent
Erickson

(10) Patent No.: US 9,039,797 B2
(45) Date of Patent: May 26, 2015

(54) SHAPED ABRASIVE PARTICLES AND METHOD OF MAKING

(75) Inventor: Dwight D. Erickson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 37 days.

(21) Appl. No.: 13/818,365

(22) PCT Filed: Oct. 19, 2011

(86) PCT No.: PCT/US2011/056833
§ 371 (c)(1),
(2), (4) Date: Feb. 22, 2013

(87) PCT Pub. No.: WO2012/061016
PCT Pub. Date: May 10, 2012

(65) Prior Publication Data
US 2013/0263525 A1    Oct. 10, 2013

Related U.S. Application Data

(60) Provisional application No. 61/408,788, filed on Nov. 1, 2010.

(51) Int. Cl.
*C09K 3/14* (2006.01)
*B24D 3/06* (2006.01)
*B24D 3/00* (2006.01)

(52) U.S. Cl.
CPC .............. *B24D 3/008* (2013.01); *C09K 3/1418* (2013.01)

(58) Field of Classification Search
CPC ...... C09K 3/14; C09K 3/1409; C09K 3/1418; B24D 11/00
See application file for complete search history.

(56) References Cited

U.S. PATENT DOCUMENTS

| | | | |
|---|---|---|---|
| 1,910,444 A | 5/1933 | Nicholson |
| 3,041,156 A | 6/1962 | Roswe |
| 3,859,407 A | 1/1975 | Blanding |
| 4,261,706 A | 4/1981 | Blanding |
| 4,744,802 A | 5/1988 | Schwabel |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |

(Continued)

FOREIGN PATENT DOCUMENTS

EP    0 293 163    11/1988

OTHER PUBLICATIONS

U.S. Appl. No. 61/408,813 entitled "Laser Method for Making Shaped Ceramic Abrasive Particles, Shaped Ceramic Abrasive Particles, and Abrasive Articles" filed Nov. 1, 2010.

*Primary Examiner* — Pegah Parvini
(74) *Attorney, Agent, or Firm* — Scott A. Baum; David B. Patchett

(57) ABSTRACT

A method of making shaped abrasive particles including forming an abrasive flake comprising a plurality of precursor shaped abrasive particles and a frangible support joining the precursor shaped abrasive particles together; transporting the abrasive flake through a rotary kiln to sinter the abrasive flake; and breaking the sintered abrasive flake into individual shaped abrasive particles. The method is useful to make small shaped abrasive particles having insufficient mass to be efficiently individually sintered in a rotary kiln without joining two or more of the shaped abrasive particles together.

13 Claims, 3 Drawing Sheets

(56) References Cited

U.S. PATENT DOCUMENTS

| | | |
|---|---|---|
| 5,085,671 A | 2/1992 | Martin |
| 5,152,917 A | 10/1992 | Pieper |
| 5,201,916 A | 4/1993 | Berg |
| 5,213,591 A | 5/1993 | Celikkaya |
| 5,352,254 A | 10/1994 | Celikkaya |
| 5,366,523 A | 11/1994 | Rowenhorst |
| 5,435,816 A | 7/1995 | Spurgeon |
| 5,500,273 A | 3/1996 | Holmes |
| 5,551,963 A | 9/1996 | Larmie |
| RE35,570 E | 7/1997 | Rowenhorst |
| 5,645,619 A | 7/1997 | Erickson |
| 5,672,097 A | 9/1997 | Hoopman |
| 5,946,991 A | 9/1999 | Hoopman |
| 5,975,987 A | 11/1999 | Hoopman |
| 5,984,988 A | 11/1999 | Berg |
| 6,129,540 A | 10/2000 | Hoopman |
| 6,277,161 B1 | 8/2001 | Castro |
| 7,524,345 B2 | 4/2009 | Nevoret |
| 2005/0137078 A1 | 6/2005 | Anderson |
| 2008/0299875 A1 | 12/2008 | Duescher |
| 2009/0169816 A1 | 7/2009 | Erickson |
| 2010/0146867 A1 | 6/2010 | Boden |
| 2010/0151195 A1 | 6/2010 | Culler |
| 2010/0151196 A1 | 6/2010 | Adefris |
| 2010/0151201 A1 | 6/2010 | Erickson |
| 2012/0227333 A1 | 9/2012 | Adefris |

SHAPED ABRASIVE PARTICLES AND METHOD OF MAKING

CROSS REFERENCE TO RELATED APPLICATIONS

This application is a national stage filing under 35 U.S.C. 371 of PCT/US2011/056833, filed Oct. 19, 2011, which claims priority to U.S. Provisional Patent Application No. 61/408,788 filed Nov. 1, 2010, the disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst (Re. 35,570); and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle, it is possible to control the resulting performance of the abrasive article. In order to reduce the cut rate and improve the finish when using shaped abrasive particles to abrade work pieces, smaller sized shaped abrasive particles are required. Typically, shaped abrasive particles that are produced in commercial quantities are calcined and sintered in a rotary kiln, instead of an oven, in order to economically produce large quantities when manufacturing the shaped abrasive particles. Rotary kilns often have a counter-current hot air flow relative to the abrasive particle's travel down the inclined slope of the rotary kiln. As the shaped abrasive particle becomes smaller and smaller, the air currents within the rotary kiln can impede its progress through the rotary kiln slowing the normal residence time within the rotary kiln or even picking up and exhausting the shaped abrasive particles with the gaseous volatiles produced during sintering. As the shaped abrasive particle becomes too small, eventually none of the shaped abrasive particles exit from the rotary kiln and all remain inside the kiln or are exhausted with the gaseous volatiles.

The inventor has determined that to solve this problem it is necessary to temporarily connect the shaped abrasive particles to each other with a frangible support in order to form larger abrasive flakes containing the individually formed shaped abrasive particles. These larger abrasive flakes can readily pass through the rotary kiln due to their size without the above described problems and then can be mechanically manipulated to break the sintered abrasive flakes into the individual shaped abrasive particles. The frangible support can be a substantially continuous thin web of the material surrounding the shaped abrasive particle or discontinuous bond posts connecting each shaped abrasive particle to the next shaped abrasive particle. By controlling the thickness of the frangible support, its fracture toughness can be controlled to enable fracturing the sintered abrasive flake into individual shaped abrasive particles.

Hence, in one embodiment, the invention resides in a method of making shaped abrasive particles comprising: forming an abrasive flake comprising a plurality of precursor shaped abrasive particles and a frangible support joining the precursor shaped abrasive particles together; transporting the abrasive flake through a rotary kiln to sinter the abrasive flake; and breaking the sintered abrasive flake into individual shaped abrasive particles.

In another embodiment, the invention resides in a sintered abrasive flake comprising a plurality of shaped abrasive particles and a frangible support joining the shaped abrasive particles together.

In another embodiment, the invention resides in a plurality of shaped abrasive particles having an abrasives industry specified nominal grade or nominal screened grade each of the shaped abrasive particles comprising a fractured surface of a frangible support attached to the shaped abrasive particle.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1:
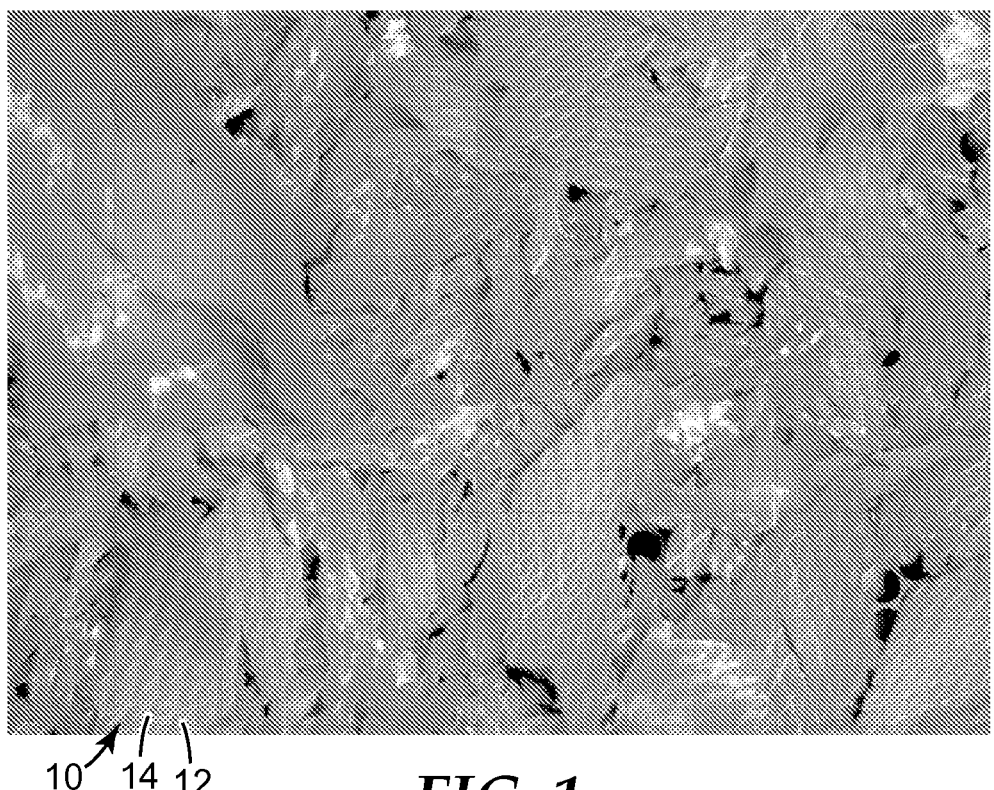
FIG. 1 is a photomicrograph of sintered abrasive flakes comprising shaped abrasive particles and a frangible support.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, "abrasive flake" refers to the unsintered structure of a plurality of precursor shaped abrasive particles joined together by a frangible support while "sintered abrasive flake" refers to the structure after being sintered comprising a plurality of shaped abrasive particles joined together by a frangible support.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape. Often the shape is replicated from a mold cavity used to form the precursor shaped abrasive particle. Except in the case of abrasive shards (e.g. as described in U.S. application Ser. No. 12/336,877), the shaped abrasive particle will generally have a predetermined geometric shape that substantially replicates the mold cavity that was used to form the shaped abrasive particle. The mold cavity could reside on the surface of an embossing roll or be contained within a flexible belt or production tooling. Alternatively, the shaped abrasive particles can be precisely cut from a sheet of dried sol-gel by a laser beam into the desired geometric shape.

DETAILED DESCRIPTION

Sintered Abrasive Flakes

Referring to FIG. 1 sintered abrasive flakes 10 comprising shaped abrasive particles 12 and a frangible support 14 are illustrated. The sintered abrasive flakes, the shaped abrasive particles, and the frangible support comprise a ceramic. In one embodiment, the ceramic can comprise alpha alumina particles made from a dispersion of aluminum oxide hydroxide or aluminum monohydrate that is gelled, molded to a specific shape, dried to form abrasive flakes containing precursor shaped abrasive particles, calcined, and then sintered as discussed herein later.

In order to effectively process the abrasive flakes through the rotary kiln, the largest dimension of the sintered abrasive flakes should be greater than or equal to 0.50, 0.60, or 0.70 mm. As the size of the abrasive flake becomes larger, it is more easily processed through the rotary kiln without undue influence from air currents within the kiln or even sticking to the interior of the kiln due to the abrasive flake having too small of a mass. However, large abrasive flakes are prone to sol-gel cracking (desiccation cracking) and are thus somewhat self-limiting in their maximum size. In some embodiments, the sintered abrasive flakes have a maximum dimension of 2 cm or less. In embodiments of the invention, the size of the sintered abrasive flakes can be such that they do not pass through a U.S.A. Standard Test Sieve conforming to ASTM E-11 having a mesh size of 18, 16, 14, or smaller size sieve number and are retained within the sieve.

In other embodiments of the invention, the average mass of the sintered abrasive flakes can be greater than or equal to $7 \times 10^{-3}$ grams, greater than or equal to $9 \times 10^{-3}$ grams, or greater than or equal to $11 \times 10^{-3}$ grams. The average mass of the sintered abrasive flakes can be determined by weighing 100 individual sintered abrasive flakes and averaging the result. The inventors have determined than when making individual shaped abrasive particles having an average mass of less than $9 \times 10^{-3}$ grams, the efficiency of the process begins to decrease and losses of the shaped abrasive particles when sintering in a rotary kiln begin to occur.

The method of processing the abrasive flakes through the rotary kiln is especially effective when the overall size (defined as the minimum dimension that passes through a screen) of the shaped abrasive particles after being separated from the frangible support is less than or equal to 0.70, 0.60, or 0.50 mm and greater than 0.0 mm. As the shaped abrasive particle's size becomes larger, it is unnecessary to interconnect several particles to efficiently sinter the particles in a rotary kiln. Once the size is large enough to sinter individual particles, it is easier to do that directly without the added processing steps of interconnecting the precursor shaped abrasive particles prior to sintering and then separating the shaped abrasive particles after sintering. In embodiments of the invention, the size of the shaped abrasive particles, after being separated, pass through a U.S.A. Standard Test Sieve conforming to ASTM E-11 having a mesh size of 18, 20, 25 or greater size sieve number and are not retained within the sieve.

In other embodiments of the invention, the average mass of the shaped abrasive particles, after being separated, can be less than or equal to $5 \times 10^{-3}$ grams, less than or equal to $7 \times 10^{-3}$ grams, or less than or equal to $9 \times 10^{-3}$ grams. The average mass of the shaped abrasive particles can be determined by weighing 100 individual shaped abrasive particles and averaging the result. In the embodiment illustrated in FIGS. 3 and 4, the shaped abrasive particles had an average mass of $9 \times 10^{-5}$ grams.

Based on the above size ranges, in general, each abrasive flake or sintered abrasive flake will contain approximately 2 to 1000, or 5 to 100, or 5 to 50 precursor shaped abrasive particles or shaped abrasive particles held together by the frangible support. In many embodiments, the frangible support will comprise a continuous web or flange connecting the edges of each shaped abrasive particle to the next as best seen in FIG. 1. In order to prevent the shaped abrasive particles from separating during sintering, but still allow for the particles to be readily separated after sintering, the thickness of the continuous web should be controlled. In particular, the thickness of the continuous web connecting individual precursor shaped abrasive particles or shaped abrasive particles should be from 0.03 to 0.15 mm, or from 0.01 to 0.20 mm, or from 0.005 to 0.25 mm (as measured in the unfired state prior to calcining or sintering, or 2 to 150 μm, 5 to 100 μm, or 10 to 50 μm after sintering. If the thickness is too small, then the abrasive flakes could prematurely separate into precursor shaped abrasive particles during handling. If the thickness is too large, then the shaped abrasive particles could be damaged or fractured when trying to separate them from the continuous web or be extremely difficult to separate from the frangible support.

Figure 2:
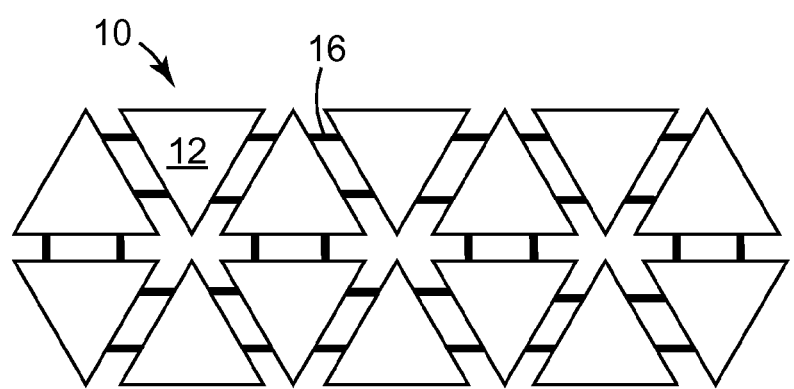
FIG. 2 is an illustration of an sintered abrasive flake comprising shaped abrasive particles and a frangible support.

In some embodiments, the frangible support will comprise one or more bond posts 16 connecting adjacent shaped abrasive particles 12 to each other such that the abrasive flake 10 comprises a plurality of shaped abrasive particles connected to each other by a plurality of bond posts as seen in FIG. 2. While the bond posts can be located anywhere on the shaped abrasive particle, typically they will be located along the edges of the shaped abrasive particles and not at the vertices where the edges intersect as illustrated in FIG. 2. Locating the bond posts at the vertices could have an effect on the grinding performance, since the vertex of the shaped abrasive particle is often the initial cutting point during use. As such, it is desirable to mold this to a specific cutting profile and not have an uncontrolled, fractured surface present at this location. In general, each shaped abrasive particle or precursor shaped abrasive particle in the sintered abrasive flake or the abrasive flake will comprise from 2 to 20 bond posts, or from 2 to 10 bond posts joining the shaped abrasive particle to the surrounding shaped abrasive particles in the abrasive flake.

Often the thickness of the bond posts will be greater than that of the continuous web as the area of the frangible support adjoining individual particles is reduced; however, this is not a requirement. Greater bond post thickness at the discrete bond post locations can help to keep the shaped abrasive particles attached to one another while being transported through the kiln. In particular, the thickness of the bond posts can be from 0.03 to 0.15 mm, or from 0.01 to 0.20 mm, or from 0.005 to 0.25 mm (as measured in the unfired state prior to calcining or sintering), or 2 to 150 µm, 5 to 100 µm, or 10 to 50 µm after sintering. If the thickness is too small, then the abrasive flakes could prematurely separate into the precursor shaped abrasive particles during handling. If the thickness is too large, then the shaped abrasive particles could be damaged or fractured when trying to separate them from the bond posts.

The width of the bond posts along the edge can vary significantly since as they become wider they approach a continuous web as one bond post nearly touches the next adjacent bond post. However, in general, the bond posts will have a coverage percentage (calculated as the total distance for all bond posts along a side edge divided by the length of the side edge times 100) that is equal to or less than 50%, 40%, 30%, 20%, or 10%. Reducing the width of the individual bond posts allows for a cleaner edge having less fractured surface area once the shaped abrasive particles are separated after sintering. This often will produce a sharper shaped abrasive particle. In some embodiments, the bond posts could interfere with the finish when very small shaped abrasive particles are made and the bond posts do not fracture cleanly from the edge of the shaped abrasive particles.

Shaped Abrasive Particles

Figure 5A:
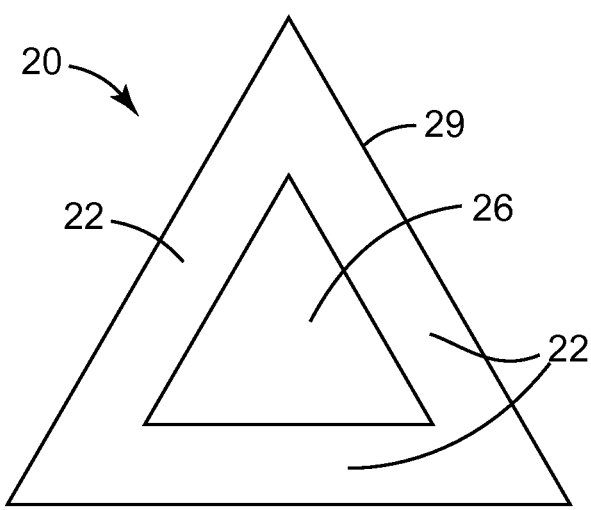
FIGS. 5A and 5B are illustrations of another embodiment of shaped abrasive particles.
Figure 5B:
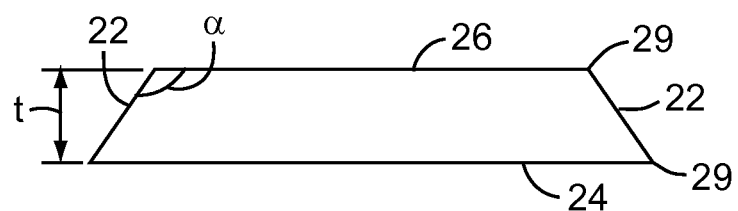

Referring to FIG. 5A and 5b, in one embodiment, the shaped abrasive particles after separation from the frangible support can comprise thin bodies having a first major surface 24, and a second major surface 26 and having a thickness T. In some embodiments, the thickness T ranges between about 5 micrometers to about 1 millimeter. The shaped abrasive particles can comprise a uniform thickness or the thickness of the shaped abrasive particles can taper or vary. In some embodiments, the first major surface 24 and the second major surface 26 are connected to each other by at least one sidewall 22, which may be a sloping sidewall as having a draft angle α between the second major surface 26 and the sidewall 22 other than 90 degrees. In some embodiments, more than one sloping sidewall 22 can be present and the slope or angle for each sloping sidewall 22 may be the same or different as more fully described in pending U.S. patent application Ser. No. 12/337,075 filed on Dec. 17, 2008 entitled "Shaped Abrasive Particles With A Sloping Sidewall." In other embodiments, the sidewall 22 can intersect the first major surface 24 and the second major surface 26 at a 90 degree angle.

The first and second major surfaces (24, 26) comprise a selected geometric shape such as a circle, an oval, a triangle, a quadrilateral (rectangle, square, trapezoid, rhombus, rhomboid, kite, superellipse), or other multi-edged geometric shape (pentagon, hexagon, octagon, etc). Alternatively, the first and second major surfaces (24, 26) can comprise an irregular, repeatable shape (replicated by the mold cavity) or a shape combining line segments and arcuate segments to form the outline or perimeter. Depending on the draft angle α, the areas of the first and second major surfaces of each shaped abrasive particle can be the same or different. In many embodiments, the shaped abrasive particles comprise a prism (90 degree draft angle) or a truncated pyramid (draft angle not equal to 90 degrees) such as a triangular prism, a truncated triangular pyramid, a rhombus prism, or a truncated rhombus pyramid to name a few possibilities.

In various embodiments of the invention, the draft angle α can be between approximately 90 degrees to approximately 135 degrees, or between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent application Ser. No. 12/337,075 entitled "Shaped Abrasive Particles With A Sloping Sidewall" filed on Dec. 17, 2008, specific ranges for the draft angle α have been found to produce surprising increases in the grinding performance of coated abrasive articles made from the shaped abrasive particles with a sloping sidewall. In particular, draft angles of 98 degrees, 120 degrees, or 135 degrees have been found to have improved grinding performance over a draft angle of 90 degrees. The improvement in grinding performance is particularly pronounced at draft angles of 98 degrees or 120 degrees as seen in FIGS. 6 and 7 of U.S. patent application Ser. No. 12/337,075.

In various embodiments of the invention, the shaped abrasive particles 20 can include additional features. In some embodiments, the first major surface 24 is substantially planar, the second major surface 26 is substantially planar, or both are substantially planar. Alternatively, one side could be concave or recessed as discussed in more detail in copending U.S. patent application Ser. No. 12/336,961 entitled "Dish-Shaped Abrasive Particles With A Recessed Surface", filed on Dec. 17, 2008. A concave or recessed surface can be created by selecting drying conditions for the sol-gel while residing in the mold cavity that forms a meniscus in the sol-gel tending to wick the edges of the sol-gel up the sides of the mold as discussed in U.S. patent application Ser. No. 12/336,961. A concave surface may help to increase the cutting performance in some applications similar to a hollow ground chisel blade.

Additionally, one or more openings passing through the first major surface 24 and the second major surface 26 could be present in the shaped abrasive particles as discussed in more detail in copending U.S. patent application Ser. No. 12/337,112 entitled "Shaped Abrasive Particles With An Opening", filed on Dec. 17, 2008. An opening through the shaped abrasive particles can reduce the bulk density of the shaped abrasive particles thereby increasing the porosity of the resulting abrasive article in some applications, such as a grinding wheel, where increased porosity is often desired. Alternatively, the opening can reduce shelling by anchoring the particle into the size coat more firmly or the opening can act as a reservoir for a grinding aid. An opening can be formed into the shaped abrasive particle by selecting drying conditions that exaggerate the meniscus phenomenon discussed above, or by making a mold having one or more posts extending from the mold's surface. Methods of making shaped abrasive particles with an opening are discussed in U.S. patent application Ser. No. 12/337,112.

Additionally, the shaped abrasive particles can have a plurality of grooves on the first or second major surface as described in copending patent application U.S. Ser. No. 12/627,567 entitled "Shaped Abrasive Particles With Grooves" filed on Nov. 30, 2009. The grooves are formed by a plurality of ridges in the surface of the mold cavity that have been found to make it easier to remove the precursor shaped abrasive particles from the mold. It is believed that a ridge having a triangular shaped cross section acts as a wedge lifting the precursor shaped abrasive particle off of the mold's bottom surface under drying conditions that promote shrinkage of the sol-gel while residing in the mold cavity.

Another suitable shaped abrasive particle is disclosed in U.S. provisional patent application Ser. No. 61/266,000 entitled "Dual Tapered Shaped Abrasive Particles" filed on Dec. 2, 2009. These shaped abrasive particles comprise a first side, a second side, a maximum length along a longitudinal axis and a maximum width transverse to the longitudinal axis.

The first side comprises a quadrilateral having four edges and four vertices with the quadrilateral selected from the group consisting of a rhombus, a rhomboid, a kite, or a superellipse. The second side comprises a vertex and four facets forming a pyramid. The aspect ratio of the maximum length to the maximum width is 1.3 or greater. An example of such a shaped abrasive particle is shown in FIG. 4.

Figure 4:
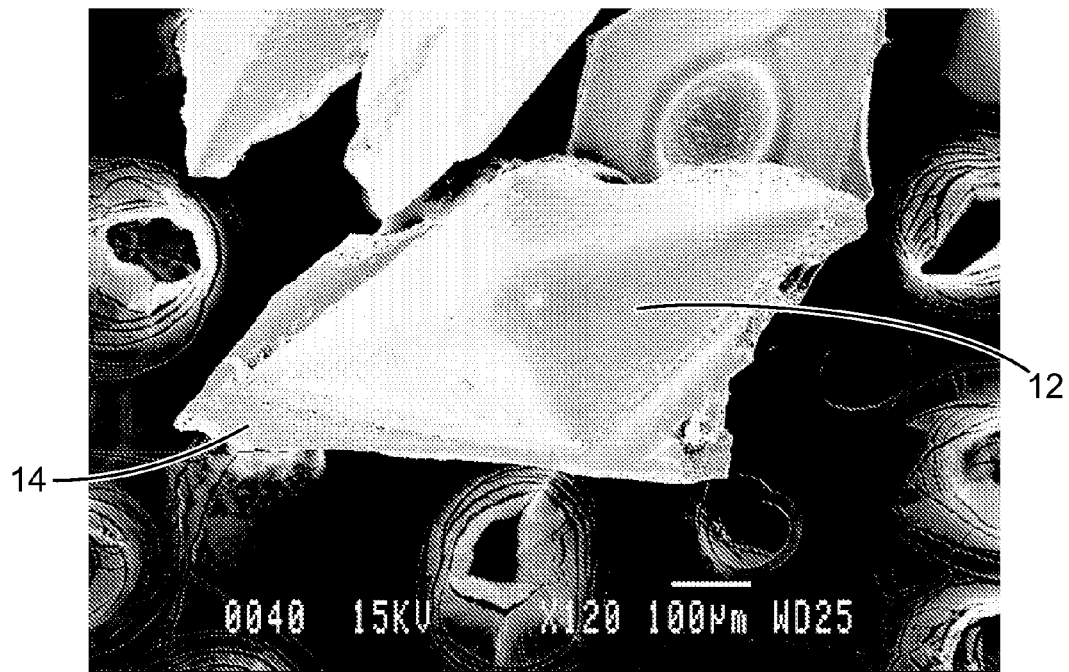
FIG. 4 is a photograph of a shaped abrasive particle and with a portion of the frangible support remaining attached to the shaped abrasive particle.

Referring to FIG. 4, the shaped abrasive particles after separation from the frangible support comprise a fractured surface. In the embodiment shown in FIG. 4, the fractured surface is located on a flange or flashing extending from the edge of the shaped abrasive particle. In order to prevent the shaped abrasive particles from separating during sintering, but still allow for the particles to be readily separated after sintering, the thickness of the flange or flashing should be controlled. In particular, the thickness of the flange or flashing should be from 0.03 to 0.15 mm, or from 0.01 to 0.20 mm, or from 0.005 to 0.25 mm (as measured in the unfired state prior to calcining or sintering), or 2 to 150 µm, 5 to 100 µm, or 10 to 50 µm after sintering.

The shaped abrasive particles 20 may also have a surface coating. Surface coatings are known to improve the adhesion between abrasive grains and the binder in abrasive articles or can be used to aid in electrostatic deposition of the shaped abrasive particles 20. Such surface coatings are described in U.S. Pat. Nos. 5,213,591; 5,011,508; 1,910,444; 3,041,156; 5,009,675; 5,085,671; 4,997,461; and 5,042,991. In one embodiment, surface coatings as described in U.S. Pat. No. 5,352,254 in an amount of 0.1%-2% inorganics to shaped abrasive particle weight were used. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

In another embodiment, a plurality of shaped abrasive particles having an abrasives industry specified nominal grade or nominal screened grade, with each of the shaped abrasive particles comprising a fractured surface of a frangible support attached to the shaped abrasive particle are provided. The shaped abrasive particles made according to the present disclosure can be incorporated into an abrasive article selected from the group consisting of an coated abrasive article, a bonded abrasive article, a nonwoven abrasive article, or an abrasive brush, an agglomerate, or used in loose form (abrasive slurry polishing). Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS6, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the shaped abrasive particles can graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through a 14 mesh test sieve and can be retained on a 16, 18, 20, 25, 30, 35, 40, 45, or 50 mesh test sieve. In various embodiments of the invention, the shaped abrasive particles can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

Method of Making Abrasive Flakes and Shaped Abrasive Particles

Materials that can be made into shaped ceramic objects using the process of the invention include physical precursors such as finely divided particles of known ceramic materials such as alpha alumina, silicon carbide, alumina/zirconia and CBN. Also included are chemical and/or morphological precursors such as aluminum trihydrate, boehmite, gamma alumina and other transitional aluminas and bauxite. The most useful of the above are typically based on alumina and its physical or chemical precursors. It is to be understood however that the invention is not so limited but is capable of being adapted for use with a plurality of different precursor materials.

Other components that have been found to be desirable in certain circumstances for the production of alumina-based particles include nucleating agents such as finely divided alpha alumina, ferric oxide, chromium oxide and other materials capable of nucleating the transformation of precursor forms to the alpha alumina form; magnesia; titania; zirconia; yttria; and rare earth metal oxides. Such additives often act as crystal growth limiters or boundary phase modifiers. The amount of such additives in the precursor is usually less than about 10% and often less than 5% by weight (solids basis).

It is also possible to use, instead of a chemical or morphological precursor of alpha alumina, a slip of finely divided alpha alumina itself together with an organic compound that will maintain it in suspension and act as a temporary binder while the particle is being fired to essentially full densification. In such cases, it is often possible to include in the suspension materials that will form a separate phase upon firing or that can act as an aid in maintaining the structural integrity of the shaped particles either during drying and firing, or after firing. Such materials may be present as impurities. If, for example, the precursor is finely divided bauxite, there will be a small proportion of vitreous material present that will form a second phase after the powder grains are sintered together to form the shaped particle.

The dispersion that is employed in the process of the invention may be any dispersion of a ceramic precursor such as a finely dispersed material that, after being subjected to the process of the invention, is in the form of a shaped ceramic article. The dispersion may be chemically a precursor, as for example boehmite is a chemical precursor of alpha alumina; a morphological precursor as for example gamma alumina is a morphological precursor of alpha alumina; as well as (or alternatively), physically a precursor in the sense of that a finely divided form of alpha alumina can be formed into a shape and sintered to retain that shape.

Where the dispersion comprises a physical or morphological precursor as the term is used herein, the precursor is in the form of finely divided powder grains that, when sintered together, form a ceramic article, such as an abrasive particle of utility in conventional bonded and coated abrasive applications. Such materials generally comprise powder grains with an average size of less than about 20 microns, preferably less than about 10 microns and most preferably less than about a micron.

The dispersion used in a preferred process is most conveniently a boehmite sol-gel. The sol-gel may be a seeded sol-gel that comprises finely dispersed seed particles capable of nucleating the conversion of alumina precursors to alpha alumina or an unseeded sol-gel that transforms into alpha alumina when sintered.

The solids content of the dispersion of a physical or a morphological precursor is preferably from about 40 to 65% though higher solids contents of up to about 80% can be used. An organic compound is frequently used along with the finely divided grains in such dispersions as a suspending agent or perhaps as a temporary binder until the formed particle has been dried sufficiently to maintain its shape. This can be any of those generally known for such purposes such as polyethylene glycol, sorbitan esters and the like.

The solids content of a precursor that changes to the final stable ceramic form upon heating may need to take into account water that may be liberated from the precursor during drying and firing to sinter the abrasive particles. In such cases the solids content is typically somewhat lower such as about 75% or lower and more preferably between about 30% and about 50%. With a boehmite sol-gel, a maximum solids content of about 60% or even 40% can be used and a sol-gel with a peptized minimum solids content of about 20% may also be used.

Abrasive particles made from physical precursors will typically need to be fired at higher temperatures than those formed from a seeded chemical precursor. For example, whereas particles of a seeded boehmite sol-gel form an essentially fully densified alpha alumina at temperatures below about 1250 degrees C., particles made from unseeded boehmite sol-gels may require a firing temperature of above about 1400 degrees C. for full densification.

In one embodiment of making the shaped abrasive particles, the following process steps can be utilized. The first process step involves providing either a seeded on non-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles 20 will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, by simply mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold having at least one mold cavity, and preferably a plurality of cavities. The cavity has a specified three-dimensional shape to make the shaped abrasive particles illustrated in FIGS. 1-5. In general, the shape of the cavity adjacent to the mold's upper surface forms the perimeter of the first major surface 24. The perimeter of the mold cavity at the bottom forms perimeter of the second major surface 26.

The plurality of cavities can be formed in a production tool. The production tool can be a belt, a sheet, a continuous web, a coating roll such as a rotogravure roll, a sleeve mounted on a coating roll, an embossing roll or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface. In one embodiment, the top surface is substantially parallel to bottom surface of the mold with the cavities having a substantially uniform depth. One side of the mold, i.e. the side in which the cavity is formed, can remain exposed to the surrounding atmosphere during the step in which the volatile component is removed.

The third process step involves filling the cavities in the mold with the abrasive dispersion by any conventional technique. In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc sterate, and graphite. In general, between about 0.1% to about 5% by weight mold release agent, such as peanut oil, in a liquid, such as water or alcohol, is applied to the surfaces of the production tooling in contact with the sol-gel such that between about 0.1 mg/in$^2$ to about 3.0 mg/in$^2$, or between about 0.1 mg/in$^2$ to about 5.0 mg/in$^2$ of the mold release agent is present per unit area of the mold when a mold release is desired. In one embodiment, the top surface of the mold is coated with the abrasive dispersion. The abrasive dispersion can be pumped or applied onto top surface. Next, a scraper or leveler bar can be used to force the abrasive dispersion fully into the cavity of the mold. The remaining portion of the abrasive dispersion that does not enter the cavity forms the frangible support that adjoins adjacent shaped abrasive particles. Alternatively, a sheet of the abrasive dispersion or precursor ceramic material can be embossed or molded by a roll into a plurality of shaped structures joined by a frangible support, which can be later separated into shaped abrasive particles. See for example U.S. Pat. No. 3,859,407 (Blanding et al.).

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be between about 90 degrees C. to about 165 degrees C., or between about 105 degrees C. to about 150 degrees C., or between about 105 degrees C. to about 120 degrees C. Higher temperatures can lead to improved production speeds but can also lead to degradation of the polypropylene tooling limiting its useful life as a mold.

Abrasive flakes can be formed by allowing the sol-gel to be dried at either room temperature or at elevated temperatures while the precursor abrasive particles reside in the tooling used to mold the precursor shaped abrasive particles. As the sol-gel dries, it is prone to sol-gel cracking (desiccation cracking similar to the cracks that form in dried up mud puddles) and will form a plurality of abrasive flakes of various sizes while supported by the tooling. Alternatively, a rotary die cutter can be used to cut specific sized abrasive flakes while the sol-gel resides in the tooling prior to the onset of desiccation cracking.

In another embodiment, a laser can be used to cut a dried sheet of sol-gel into a plurality of precursor shaped abrasive particles joined together by a frangible support. The laser can be used to partially cut through the thickness of the sol-gel forming the edges of the precursor shaped abrasive particles or the laser can cut out the precursor shaped abrasive particle leaving one or more bond posts attaching precursor shaped abrasive particle to one or more other precursor, shaped abrasive particles. After cutting with the laser, and optionally drying, the sheet can be broken into appropriate sized abrasive flakes, or the laser can fully cut through the sheet in selected areas to make discrete abrasive flakes which are then sintered. Alternatively, the laser can be used to cut appropriate sized abrasive flakes while the precursor abrasive particles reside in the tooling used to mold them. More information concerning laser cutting shaped abrasive particles can be found in pending U.S. patent application and U.S. Ser. No. 61/408,813 entitled "Laser Method For Making Shaped Ceramic Abrasive Particles, Shaped Ceramic Abrasive Particles, And Abrasive Articles" co-filed on the same date as this patent application.

The fifth process step involves removing the abrasive flakes and precursor shaped abrasive particles from the mold cavities. The abrasive flakes can be removed from the cavities by using the following processes alone or in combination on the mold: gravity, vibration, ultrasonic vibration, vacuum, or pressurized air to remove the particles from the mold cavities.

The abrasive flakes and precursor abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor shaped abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the abrasive flakes in an oven or rotary kiln. During calcining, essentially all the volatile material is removed, and the various components that were present in the abrasive dispersion are transformed into metal oxides. The abrasive flakes are generally heated to a temperature from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, abrasive flakes. Then the abrasive flakes are calcined again. This option is further described in European Patent Application No. 293, 163.

The seventh process step involves sintering the calcined, abrasive flakes in a rotary kiln to form alpha alumina particles. Prior to sintering, the calcined abrasive flakes are not completely densified and thus lack the desired hardness to be used as abrasive particles. Sintering takes place by heating the calcined, abrasive flakes to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, abrasive flakes must be exposed to the sintering temperature to achieve this level of conversion depends upon various factors but usually from five seconds to 48 hours is typical. In another embodiment, the duration for the sintering step ranges from one minute to 90 minutes. After sintering, the shaped abrasive particles can have a Vickers hardness of 10 GPa, 16 GPa, 18 GPa, 20 GPa, or greater.

The eighth process step involves mechanically separating the shaped abrasive particles from the sintered abrasive flake. Suitable methods include an offset roll crusher, supporting the sintered abrasive flakes on a support surface and running a roller over them, passing the sintered abrasive flakes through a nip between two rotating rolls with at least one of the rolls having an elastomeric deformable cover or other means that flexes, rather than crushes, the sintered abrasive flakes to induce breakage along the frangible support

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

A solution of 5% peanut oil in methanol was brushed onto a microreplicated polypropylene tooling having an array of right rhombic pyramidal cavities. The rhombic base had an aspect ratio greater than 2:1 (major axis: minor axis). The cavity dimensions were designed to produce shaped abrasive particles that would pass through a 50 mesh sieve but be retained on a 60 mesh sieve (i.e., particles of dimensions between 250 micrometers and 350 micrometers. A boehmite sol-gel of approximately 30% solids was subsequently spread onto polypropylene tooling and forced into the cavities using a putty knife. Care was taken to assure that the cavities were overfilled with gel so that the resulting precursor shaped abrasive particles remained interconnected by a frangible support comprising a continuous web once the sol-gel dried. The sol-gel was allowed to air dry and the precursor shaped abrasive particles were shaken from the microreplicated tooling which gave a collection of abrasive flakes of different sizes. The abrasive flakes were calcined at 650 degrees C., impregnated with a rare earth oxide (REO) solution comprising 1.4% MgO, 1.7% $Y_2O_3$, 5.7% $La_2O_3$ and 0.07% CoO, dried, calcined again at 650 degrees C. and sintered at 1400 degrees C. resulting in the abrasive flakes shown in FIG. 1.

Figure 3:
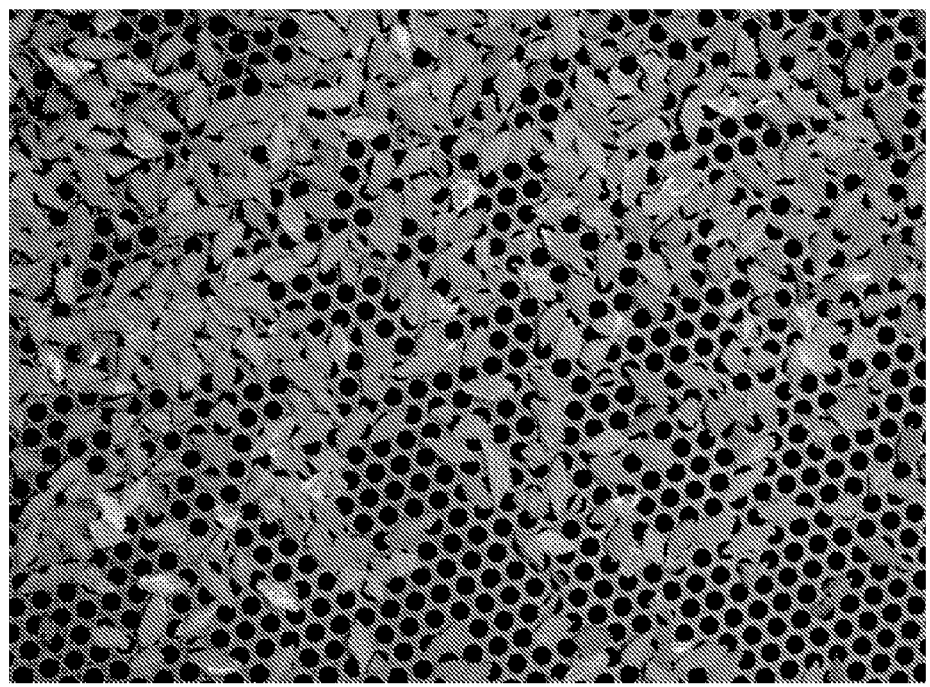
FIG. 3 is a photograph of individual shaped abrasive particles resting on a screen after mechanically breaking the frangible support.

A portion of the abrasive flakes were then put on a glass slide and were gently broken apart using a plastic wallpaper seam roller by rolling over the top of the abrasive flakes to separate the individual shaped abrasive particles from the abrasive flakes. The shaped abrasive particles were screened to separate the individual shaped abrasive particles from abrasive flakes that needed further treatment with the wallpaper roller. Shaped abrasive particles collected on the +300 micrometer screen are shown in FIG. 3. The shaped abrasive particles made by this process had a residual frangible support as shown in FIG. 4.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making shaped abrasive particles comprising:
   forming an abrasive flake comprising a plurality of precursor shaped abrasive particles and a frangible support joining the precursor shaped abrasive particles together;
   transporting the abrasive flake through a rotary kiln to sinter the abrasive flake; and
   breaking the sintered abrasive flake into individual shaped abrasive particles.

2. The method of claim 1 wherein the frangible support comprises a continuous web.

3. The method of claim 2 wherein the continuous web of the abrasive flake comprises a thickness from 0.005 to 0.25 mm.

4. The method of claim 1 wherein the abrasive flake comprises the plurality of precursor shaped abrasive particles and a plurality of bond posts joining the precursor shaped abrasive particles together.

5. The method of claim 4 wherein the precursor shaped abrasive particles comprise side edges and vertices, and the bond posts are located along the side edges and not at the vertices.

6. The method of claim 4 wherein each of the precursor shaped abrasive particles in the plurality of precursor shaped abrasive particles comprises 2 to 20 bond posts.

7. The method of claim 4 wherein the bond posts of the abrasive flake have a thickness and the thickness is from 0.005 to 0.25 mm.

8. The method of claim 1 wherein the abrasive flake comprises a largest dimension and the largest dimension is greater than 0.50 mm.

9. The method of claim 1 wherein the abrasive flake comprises a largest dimension of the largest dimension is greater than 0.70 mm and less than 2 cm.

10. The method of claim 9 wherein the sintered abrasive flake comprises from 2 to 1000 shaped abrasive particles.

11. The method of claim 1 wherein the sintered abrasive flake comprises alpha alumina particles made from a dispersion of at least one of aluminum oxide hydroxide and aluminum monohydrate.

12. The method of claim 1 wherein after separation from the frangible support, the shaped abrasive particles comprises a flange extending from the edge of the shaped abrasive particles, and further wherein the flange includes a fractured surface.

13. The method of claim 1 wherein the abrasive particles of the abrasive flake are spaced to form a gap, and further wherein the frangible support extends across the gap.

* * * * *

UNITED STATES PATENT AND TRADEMARK OFFICE
CERTIFICATE OF CORRECTION

PATENT NO. : 9,039,797 B2
APPLICATION NO. : 13/818365
DATED : May 26, 2015
INVENTOR(S) : Dwight Erickson It is certified that error appears in the above-identified patent and that said Letters Patent is hereby corrected as shown below:

In the Specification

Column 8
Line 2, delete "JIS6," and insert -- JIS16, --, therefor.

Column 12
Line 2, delete "zinc sterate," and insert -- zinc stearate, --, therefor.
Line 66, delete "application" and insert -- application having attorney docket number 65473US002 --, therefor.

Column 13
Line 61, delete "support" and insert -- support. --, therefor.

In the Claims

Column 16
Line 2, in Claim 9, delete "of the" and insert -- and the --, therefor.

Signed and Sealed this
Twenty-second Day of December, 2015

Michelle K. Lee
*Director of the United States Patent and Trademark Office*